US009664779B2

(12) United States Patent
Stainvas Olshansky et al.

(10) Patent No.: US 9,664,779 B2
(45) Date of Patent: May 30, 2017

(54) OBJECT CLASSIFICATION FOR VEHICLE RADAR SYSTEMS

(71) Applicant: GM GLOBAL TECHNOLOGY OPERATIONS LLC, Detroit, MI (US)

(72) Inventors: Inna Stainvas Olshansky, Modiin (IL); Igal Bilik, Rehovot (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 389 days.

(21) Appl. No.: 14/323,415

(22) Filed: Jul. 3, 2014

(65) Prior Publication Data
US 2016/0003935 A1    Jan. 7, 2016

(51) Int. Cl.
*G01S 7/41*    (2006.01)
*G01S 13/88*    (2006.01)
*G01S 13/93*    (2006.01)

(52) U.S. Cl.
CPC ............ *G01S 7/41* (2013.01); *G01S 7/415* (2013.01); *G01S 7/417* (2013.01); *G01S 13/88* (2013.01); *G01S 13/931* (2013.01)

(58) Field of Classification Search
CPC .......... G01S 7/41; G01S 7/417; G01S 13/931; G01S 7/415; G01S 13/88; G01S 2007/356; G08G 1/015; G06K 9/00208
USPC ............... 342/70–72, 52, 54, 55, 90
See application file for complete search history.

(56) References Cited

U.S. PATENT DOCUMENTS

| | | | | |
|---|---|---|---|---|
| 9,041,592 B2* | 5/2015 | Jeon | .................... | G01S 7/412 342/104 |
| 9,341,707 B2* | 5/2016 | Lehning | .................... | G01S 7/41 |
| 2003/0107512 A1* | 6/2003 | McFarland | ............. | G01S 7/021 342/159 |
| 2008/0106460 A1* | 5/2008 | Kurtz | .................... | G01S 7/352 342/99 |

(Continued)

FOREIGN PATENT DOCUMENTS

| CN | 101136141 A | 3/2008 |
|---|---|---|
| CN | 103593980 A | 2/2014 |

(Continued)

OTHER PUBLICATIONS

A. A. Ahmad and A. Z. Sha'ameri, "Analysis and Classification of Airborne Radar Signal Types Using Time-Frequency Analysis," Computer and Communication Engineering (ICCCE), 2014 International Conference on, Kuala Lumpur, 2014, pp. 76-79.*

(Continued)

*Primary Examiner* — John B Sotomayor
(74) *Attorney, Agent, or Firm* — Lorenz & Kopf, LLP

(57) ABSTRACT

Methods and systems are provided for object classification for a radar system of a vehicle. The radar system includes a transmitter that transmits radar signals and a receiver that receives return radar signals after the transmitted radar signals are deflected from an object proximate the vehicle. A processor is coupled the receiver, and is configured to: obtain spectrogram data from a plurality of spectrograms pertaining to the object based on the received radar signals; aggregate the spectrogram data from each of the plurality of spectrograms into a computer vision model; and classify the object based on the aggregation of the spectrogram data from each of the plurality of spectrograms into the computer vision model.

14 Claims, 7 Drawing Sheets

(56) References Cited

U.S. PATENT DOCUMENTS

| | | | |
|---|---|---|---|
| 2010/0117892 A1* | 5/2010 | Barbaresco | G01S 13/951 342/26 R |
| 2014/0049420 A1* | 2/2014 | Lehning | G01S 7/41 342/109 |
| 2014/0176679 A1* | 6/2014 | Lehning | H04N 13/0275 348/46 |
| 2016/0003935 A1* | 1/2016 | Stainvas Olshansky | G01S 7/415 342/70 |
| 2016/0003939 A1* | 1/2016 | Stainvas Olshansky | G01S 13/02 342/146 |
| 2016/0124076 A1* | 5/2016 | Nakatani | G01S 7/4026 342/174 |

FOREIGN PATENT DOCUMENTS

| | | |
|---|---|---|
| CN | 103886757 A | 6/2014 |
| WO | 2014051199 A1 | 4/2014 |

OTHER PUBLICATIONS

Y. Kim, S. Ha and J. Kwon, "Human Detection Using Doppler Radar Based on Physical Characteristics of Targets," in IEEE Geoscience and Remote Sensing Letters, vol. 12, No. 2, pp. 289-293, Feb. 2015.*

A. Eryildirim and I. Onaran, "Pulse Doppler Radar Target Recognition using a Two-Stage SVM Procedure," in IEEE Transactions on Aerospace and Electronic Systems, vol. 47, No. 2, pp. 1450-1457, Apr. 2011.*

Kyung-Tae Kim, In-Sik Choi and Hyo-Tae Kim, "Efficient radar target classification using adaptive joint time-frequency processing," in IEEE Transactions on Antennas and Propagation, vol. 48, No. 12, pp. 1789-1801, Dec. 2000.*

State Intellectual Property Office of the People's Republic of China, Office Action in Chinese Patent Application No. 201510385496.3 mailed Mar. 22, 2017.

Yanbing Li, "Study on Classification of Moving Vehicles Based on Micro-Doppler Effect," Wanfang Dissertation Database, Nov. 21, 2013, pp. 1-141.

* cited by examiner

US 9,664,779 B2

OBJECT CLASSIFICATION FOR VEHICLE RADAR SYSTEMS

TECHNICAL FIELD

The present disclosure generally relates to vehicles, and more particularly relates to methods and radar systems object classification for vehicles.

BACKGROUND

Certain vehicles today utilize radar systems. For example, certain vehicles utilize radar systems to detect and classify other vehicles, pedestrians, or other objects on a road in which the vehicle is travelling. Radar systems may be used in this manner, for example, in implementing automatic braking systems, adaptive cruise control, and avoidance features, among other vehicle features. While radar systems are generally useful for such vehicle features, in certain situations existing radar systems may have certain limitations.

Accordingly, it is desirable to provide techniques for radar system performance in vehicles, for example that may be used to provide improved classification of objects. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for object classification for a radar system of a vehicle. The method comprises obtaining spectrogram data from a plurality of spectrograms pertaining to an object proximate the vehicle based on received radar signals for the radar system, aggregating the spectrogram data from each of the plurality of spectrograms into a computer vision model, and classifying the object based on the aggregation of the spectrogram data from each of the plurality of spectrograms into the computer vision model.

In accordance with an exemplary embodiment, a radar control system is provided. The radar control system comprises a transmitter, a receiver, and a processor. The transmitter is configured to transmit radar signals. The receiver is configured to receive return radar signals after the transmitted radar signals are deflected from an object proximate the vehicle. The processor is coupled the receiver, and is configured to obtain spectrogram data from a plurality of spectrograms pertaining to the object based on the received radar signals, aggregate the spectrogram data from each of the plurality of spectrograms into a computer vision model, and classify the object based on the aggregation of the spectrogram data from each of the plurality of spectrograms into the computer vision model.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
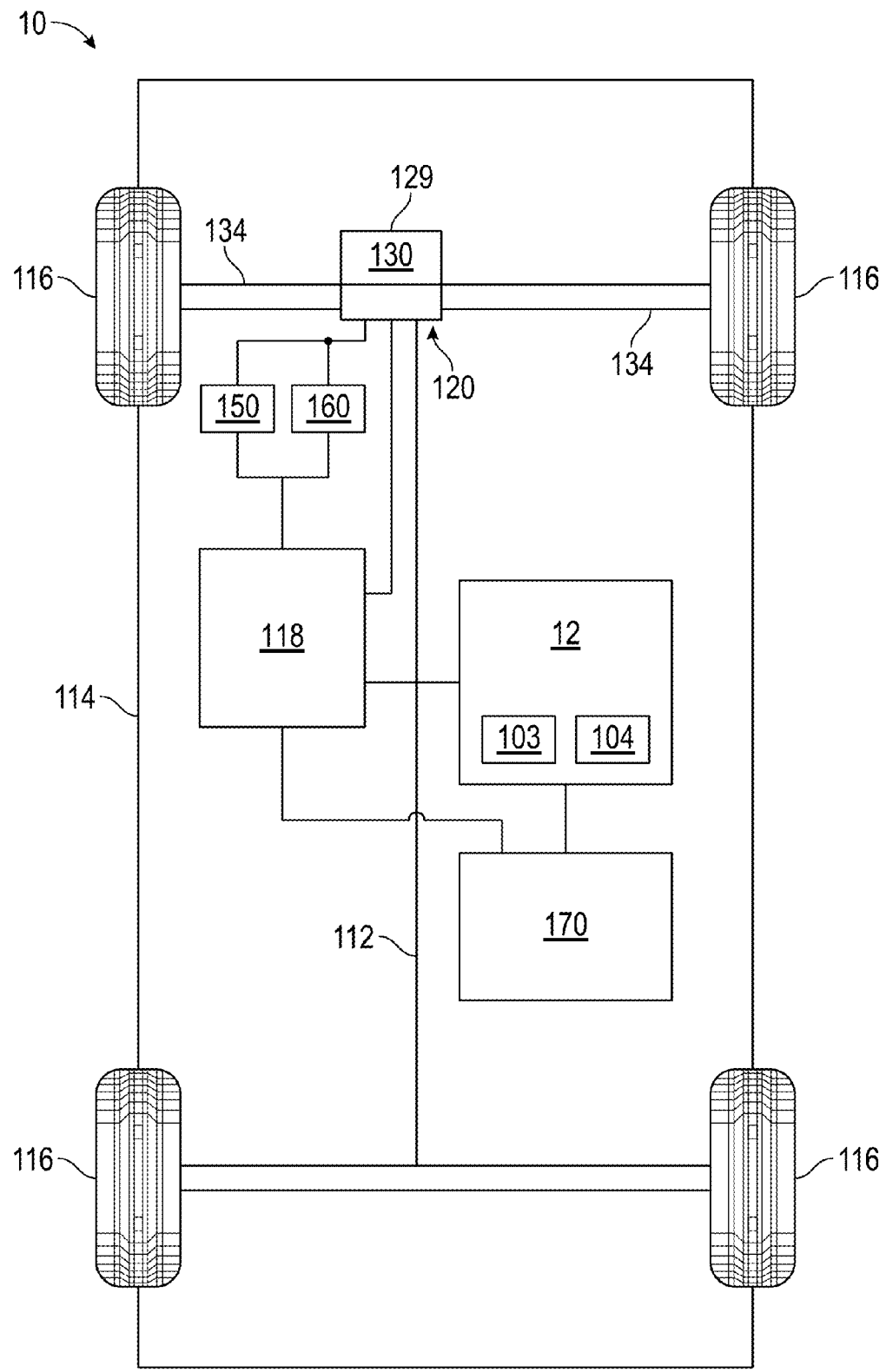
FIG. 1 is a functional block diagram of a vehicle having a control system, including a radar system, in accordance with an exemplary embodiment.

FIG. 1 provides a functional block diagram of vehicle 10, in accordance with an exemplary embodiment. As described in further detail greater below, the vehicle 10 includes a radar control system 12 having a radar system 103 and a controller 104 that classifies objects using radar signal spectrogram data in combination with one or more computer vision models.

In the depicted embodiment, the vehicle 10 also includes a chassis 112, a body 114, four wheels 116, an electronic control system 118, a steering system 150, and a braking system 160. The body 114 is arranged on the chassis 112 and substantially encloses the other components of the vehicle 10. The body 114 and the chassis 112 may jointly form a frame. The wheels 116 are each rotationally coupled to the chassis 112 near a respective corner of the body 114.

In the exemplary embodiment illustrated in FIG. 1, the vehicle 10 includes an actuator assembly 120. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is also mechanically coupled to a transmission. In other embodiments, the engine 130 may instead be coupled to a generator used to power an electric motor that is mechanically coupled to a transmission.

The steering system 150 is mounted on the chassis 112, and controls steering of the wheels 116. The steering system 150 includes a steering wheel and a steering column (not depicted). The steering wheel receives inputs from a driver of the vehicle 10. The steering column results in desired steering angles for the wheels 116 via the drive shafts 134 based on the inputs from the driver.

The braking system 160 is mounted on the chassis 112, and provides braking for the vehicle 10. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle 10, as well as various other inputs for various vehicle devices and/or systems, such as one or more vehicle radios, other entertainment or infotainment systems, environmental control systems, lightning units, navigation systems, and the like (not depicted in FIG. 1).

Also as depicted in FIG. 1, in certain embodiments the vehicle 10 may also include a telematics system 170. In one such embodiment the telematics system 170 is an onboard device that provides a variety of services through communication with a call center (not depicted) remote from the vehicle 10. In various embodiments the telematics system may include, among other features, various non-depicted features such as an electronic processing device, one or more types of electronic memory, a cellular chipset/component, a wireless modem, a dual mode antenna, and a navigation unit containing a GPS chipset/component. In certain embodiments, certain of such components may be included in the controller 104, for example as discussed further below in connection with FIG. 2. The telematics system 170 may provide various services including: turn-by-turn directions and other navigation-related services provided in conjunction with the GPS chipset/component, airbag deployment notification and other emergency or roadside assistance-related services provided in connection with various sensors and/or sensor interface modules located throughout the vehicle, and/or infotainment-related services such as music, internet web pages, movies, television programs, videogames, and/or other content.

The radar control system 12 is mounted on the chassis 112. As mentioned above, the radar control system 12 classifies objects using radar signal spectrogram data in combination with one or more computer vision models. In one example, the radar control system 12 provides these functions in accordance with the method 400 described further below in connection with FIGS. 4A-4C, and the various embodiments also described further below in connection with FIGS. 5-8.

While the radar control system 12, the radar system 103, and the controller 104 are depicted as being part of the same system, it will be appreciated that in certain embodiments these features may comprise two or more systems. In addition, in various embodiments the radar control system 12 may comprise all or part of, and/or may be coupled to, various other vehicle devices and systems, such as, among others, the actuator assembly 120, and/or the electronic control system 118.

Figure 2:
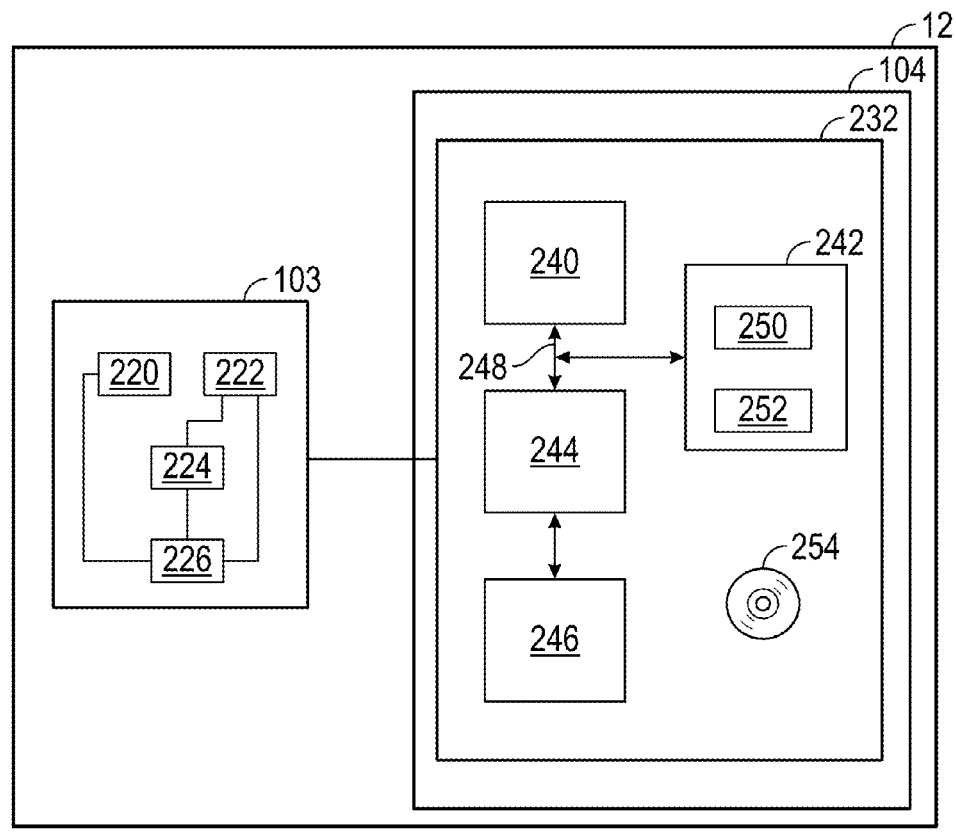
FIG. 2 is a functional block diagram of the control system of the vehicle of FIG. 1, including the radar system, in accordance with an exemplary embodiment.

With reference to FIG. 2, a functional block diagram is provided for the radar control system 12 of FIG. 1, in accordance with an exemplary embodiment. As noted above, the radar control system 12 includes the radar system 103 and the controller 104 of FIG. 1.

As depicted in FIG. 2, the radar system 103 includes one or more transmitters 220, one or more receivers 222, a memory 224, and a processing unit 226. While the transmitters 220 and receivers 222 are referred to herein as the transmitter 220 and the receiver 222, it will be appreciated that in certain embodiments multiple transmitters 220 and/or receivers 222 may be utilized, as indicated above. The transmitter 220 transmits radar signals for the radar system 103. The transmitted radar signals collectively form a beam that is transmitted by the radar system 103 for detecting objects (e.g. other vehicles, pedestrians, trees, rocks, debris, road characteristics, and so on). After the transmitted radar signals contact one or more objects on or near a road on which the vehicle 10 is travelling and is reflected/redirected toward the radar system 103, the redirected radar signals are received by the receiver 222 of the radar system 103 for processing.

Figure 3:
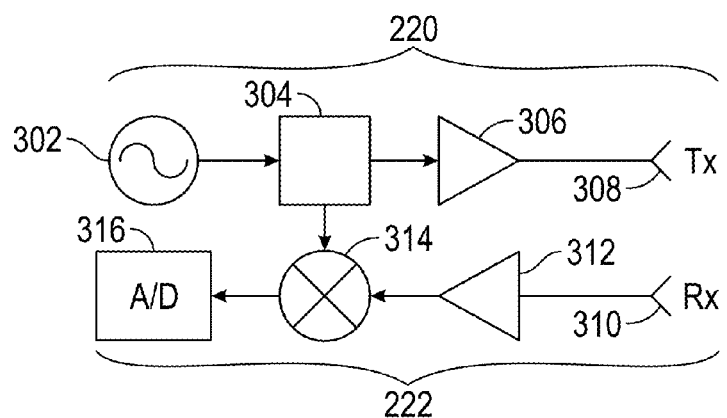
FIG. 3 is a functional block diagram of a transmission channel and a receiving channel of the radar system of FIGS. 1 and 2, in accordance with an exemplary embodiment.

With reference to FIG. 3, a representative transmitting channel 220 is depicted along with a respective receiving channel 222 of the radar system of FIG. 3, in accordance with an exemplary embodiment. As depicted in FIG. 3, the transmitting channel 220 includes a signal generator 302, a filter 304, an amplifier 306, and an antenna 308. Also as depicted in FIG. 3, the receiving channel 222 includes an antenna 310, an amplifier 312, a mixer 314, and a sampler/digitizer 316. In certain embodiments the antennas 308, 310 may comprise a single antenna, while in other embodiments the antennas 308, 310 may comprise separate antennas. Similarly, in certain embodiments the amplifiers 306, 312 may comprise a single amplifier, while in other embodiments the amplifiers 306, 312 may comprise separate amplifiers.

The radar system 103 generates the transmittal radar signals via the signal generator 302. The transmittal radar signals are filtered via the filter(s) 304, amplified via the amplifier 306, and transmitted from the radar system 103 (and from the vehicle 10 to which the radar system 103 belongs, also referred to herein as the "host vehicle") via the antenna 308. The transmitting radar signals subsequently contact other vehicles and/or other objects on or alongside the road on which the host vehicle 10 is travelling. After contacting the objects, the radar signals are reflected, and travel from the other vehicles and/or other objects in various directions, including some signals returning toward the host vehicle 10. The radar signals returning to the host vehicle 10 (also referred to herein as received radar signals) are received by the antenna 310, amplified by the amplifier 312, mixed by the mixer 314, and digitized by the sampler/digitizer 316.

Returning to FIG. 2, the radar system 103 also includes, among other possible features, the memory 224 and the processing unit 226. The memory 224 stores information received by the receiver 222 and/or the processing unit 226. In certain embodiments, such functions may be performed, in whole or in part, by a memory 242 of the computer system 232 (discussed further below).

The processing unit 226 processes the information obtained by the receivers 222 for classification of objects using radar signal spectrogram data in combination with one or more computer vision models. The processing unit 226 of the illustrated embodiment is capable of executing one or more programs (i.e., running software) to perform various tasks instructions encoded in the program(s). The processing unit 226 may include one or more microprocessors, microcontrollers, application specific integrated circuits (ASICs), or other suitable device as realized by those skilled in the art, such as, by way of example, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In certain embodiments, the radar system 103 may include multiple memories 224 and/or processing units 226, working together or separately, as is also realized by those skilled in the art. In addition, it is noted that in certain embodiments, the functions of the memory 224, and/or the processing unit 226 may be performed in whole or in part by one or more other memories, interfaces, and/or processors disposed outside the radar system 103, such as the memory 242 and the processor 240 of the controller 104 described further below.

As depicted in FIG. 2, the controller 104 is coupled to the radar system 103. Similar to the discussion above, in certain embodiments the controller 104 may be disposed in whole or in part within or as part of the radar system 103. In addition, in certain embodiments, the controller 104 is also coupled to one or more other vehicle systems (such as the electronic control system 118 of FIG. 1). The controller 104 receives and processes the information sensed or determined from the radar system 103, provides detection, classification, and tracking of objects, and implements appropriate vehicle actions based on this information. The controller 104 generally performs these functions in accordance with the method 400 discussed further below in connection with FIGS. 4-8.

As depicted in FIG. 2, the controller 104 comprises a computer system 232. In certain embodiments, the controller 104 may also include the radar system 103, one or more components thereof, and/or one or more other systems. In addition, it will be appreciated that the controller 104 may otherwise differ from the embodiment depicted in FIG. 2. For example, the controller 104 may be coupled to or may otherwise utilize one or more remote computer systems and/or other control systems, such as the electronic control system 118 of FIG. 1.

As depicted in FIG. 2, the computer system 232 includes a processor 240, a memory 242, an interface 244, a storage device 246, and a bus 248. The processor 240 performs the computation and control functions of the controller 104, and may comprise any type of processor or multiple processors, single integrated circuits such as a microprocessor, or any suitable number of integrated circuit devices and/or circuit boards working in cooperation to accomplish the functions of a processing unit. In one embodiment, the processor 240 classifies objects using radar signal spectrogram data in combination with one or more computer vision models. During operation, the processor 240 executes one or more programs 250 contained within the memory 242 and, as such, controls the general operation of the controller 104 and the computer system 232, generally in executing the processes described herein, such as those of the method 400 described further below in connection with FIGS. 4-8.

The memory 242 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 242 is located on and/or co-located on the same computer chip as the processor 240. In the depicted embodiment, the memory 242 stores the above-referenced program 250 along with one or more stored values 252 (such as, by way of example, information from the received radar signals and the spectrograms therefrom).

The bus 248 serves to transmit programs, data, status and other information or signals between the various components of the computer system 232. The interface 244 allows communication to the computer system 232, for example from a system driver and/or another computer system, and can be implemented using any suitable method and apparatus. The interface 244 can include one or more network interfaces to communicate with other systems or components. In one embodiment, the interface 244 includes a transceiver. The interface 244 may also include one or more network interfaces to communicate with technicians, and/or one or more storage interfaces to connect to storage apparatuses, such as the storage device 246.

The storage device 246 can be any suitable type of storage apparatus, including direct access storage devices such as hard disk drives, flash systems, floppy disk drives and optical disk drives. In one exemplary embodiment, the storage device 246 comprises a program product from which memory 242 can receive a program 250 that executes one or more embodiments of one or more processes of the present disclosure, such as the method 400 (and any sub-processes thereof) described further below in connection with FIGS. 4-8. In another exemplary embodiment, the program product may be directly stored in and/or otherwise accessed by the memory 242 and/or a disk (e.g., disk 254), such as that referenced below.

The bus 248 can be any suitable physical or logical means of connecting computer systems and components. This includes, but is not limited to, direct hard-wired connections, fiber optics, infrared and wireless bus technologies. During operation, the program 250 is stored in the memory 242 and executed by the processor 240.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 240) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 232 may also otherwise differ from the embodiment depicted in FIG. 2, for example in that the computer system 232 may be coupled to or may otherwise utilize one or more remote computer systems and/or other control systems.

Figures 4A, 4B:
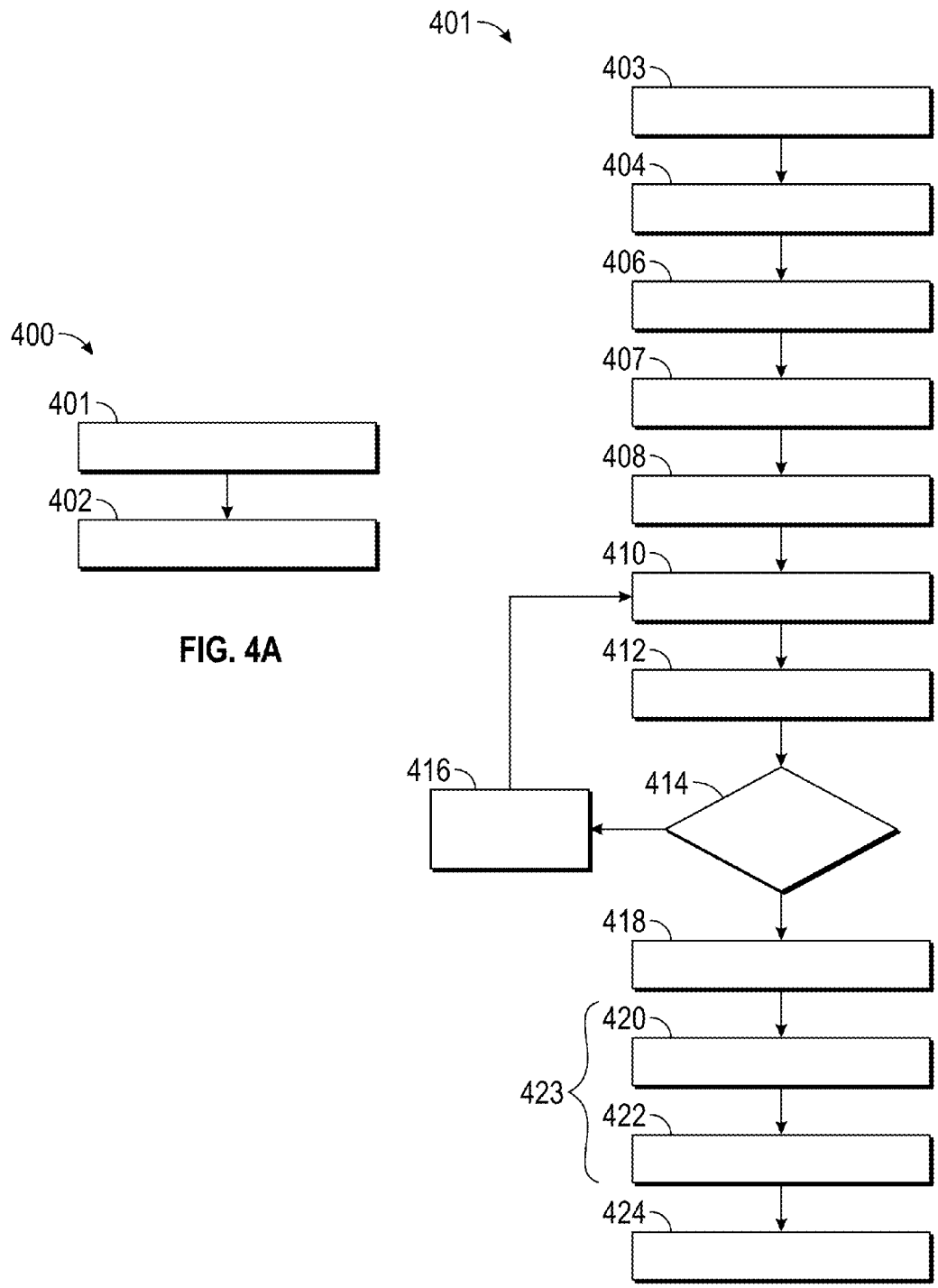
FIGS. 4A-4C are flowcharts of a method for classifying objects for a radar system, which can be used in connection with the vehicle of FIG. 1, the control system of FIGS. 1 and 2, and the radar system of FIGS. 1-3, in accordance with an exemplary embodiment.
Figures 4C, 5:
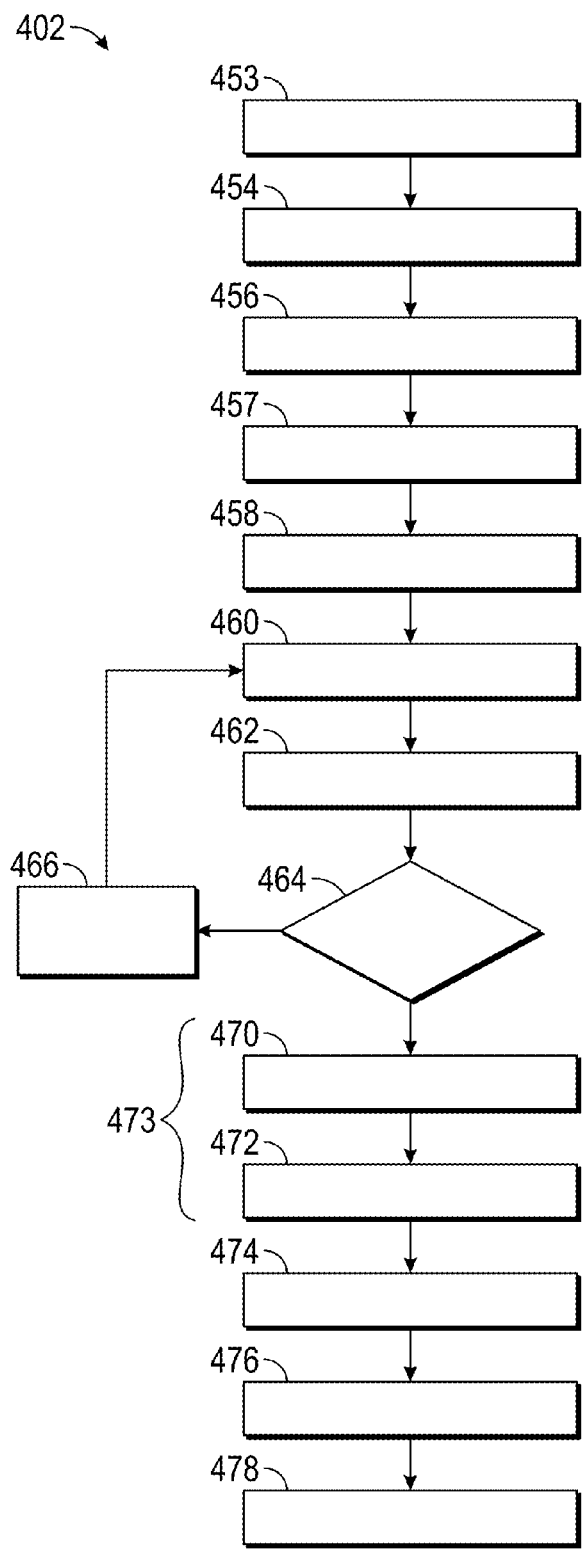
FIG. 5 is a flowchart of a sub-method of the method of FIGS. 4A-4C, namely, of utilizing a computer vision model for classification, in accordance with an exemplary embodiment in which clustering is used as part of the computer vision model.

FIGS. 4A-4C are flowcharts of a method 400 for implementing a radar system of a vehicle, in accordance with an exemplary embodiment. The method 400 can be implemented in connection with the vehicle 10 of FIG. 1 and the radar control system 12 of FIGS. 1-3, in accordance with an exemplary embodiment.

As depicted in FIG. 4A, in one embodiment the method 400 includes a training method 401 and an implementation method 402. In one embodiment, the training method 401 is performed offline, for example during manufacture of the vehicle and/or otherwise prior to the current vehicle drive or ignition cycle, and includes training of a model for classification of objects. Also in one embodiment, the implementation method 401 is performed online, for example during a current vehicle drive or ignition cycle, and implements the model in classification of objects encountered during the current vehicle drive or ignition cycle. The training method 401 will be discussed below in connection with FIG. 4B, and the implementation method 402 will be discussed further below in connection with FIG. 4C, in accordance with exemplary embodiments.

With reference to FIG. 4B, in various embodiments the training method 401 can be scheduled to run at 403 based on predetermined "offline" events (for example during manufacture of the vehicle, prior to sale of the vehicle to the customer/owner, and/or otherwise prior to the current vehicle drive or ignition cycle). As depicted in FIG. 4B, in one embodiment the training method 401 includes transmitting a first plurality of radar signals of a first waveform at 404. The radar signals are, in one example, transmitted via the transmitting channel 220 of the radar system 103 of the vehicle 10 of FIG. 1 while the vehicle 10 is driving in a road.

After the radar signals are reflected from objects on or around the road, return radar signals are received by the radar system 103 at 406 of FIG. 4B. In one example, the received radar signals are received via the receiving channel 222 of the radar system 103 of the vehicle 10 (as referenced in FIGS. 1-3) after deflection from one or more objects (e.g. other vehicles, pedestrians, trees, rocks, debris, road characteristics, and so on) on the road or otherwise in proximity to the vehicle 10. The object is detected at 427 based upon the radar received radar signals.

A first region is selected with respect to the return radar signals at 408. In one embodiment, the first region comprises a three dimensional spatial region in proximity to an object (hereafter referred to as "the object") from which the received radar signals had been reflected with respect to 405. In one such embodiment, the first region comprises a cube-shaped region proximate a portion of the object (such that multiple such cube-shaped regions would provide a more complete representation for the object). In one embodiment, the first region is selected by a processor, such as the processing unit 226 and/or the processor 240 of FIG. 2. In one embodiment, for each detected target, its surrounding is represented by spatial cells (cubes), and the information form each cell is treated as a separate data stream. Also in one embodiment, the size of the cubes is determined by the radar resolution in Range-Azimuth-Elevation.

Information pertaining to the first region is analyzed at 410. In one embodiment, the information includes a correspondence or plot of the frequency contents (i.e., the spectrogram) of the received radar signals over time. The resulting analyzed data (including the correspondence of the frequency over time) is represented in a spectrogram generated at 412 for the first region. The analysis of the information and generation of the spectrogram are performed by a processor, such as the processing unit 226 and/or the processor 240 of FIG. 2.

A determination is made at 414 as to whether analysis is required for any additional regions. In one embodiment, the determination of 414 is whether there any remaining spatial regions proximate the object for which a spectrogram has not yet been generated. In one embodiment, this determination is made by a processor, such as the processing unit 226 and/or the processor 240 of FIG. 2.

If it is determined that analysis is required for one or more additional regions requiring analysis, a new region is selected at 416. In one embodiment, at 416 a new three dimensional spatial region is selected, similar to the first region of 408, but at a slightly different location in proximity to the object. In one embodiment, the new region is selected by a processor, such as the processing unit 226 and/or the processor 240 of FIG. 2. The method proceeds to 410, and 410-416 repeat in this manner until there are no additional regions required for analysis (as determined at 414), at which point the method proceeds to 418, described below.

After 403-416 are repeated for a number of different vehicles (for example, test vehicles prior to sale to the public), the information (or data) from the various different spectrograms for the object for the various vehicles are combined or aggregated to create a collection or database at 418. This is preferably performed by a processor, such as the processing unit 226 and/or the processor 240 of FIG. 2.

At 420, features are extracted from the spectrograms in the database of 418. In one embodiment, the features are extracted in conjunction with a computer vision model that is trained during the training method 401. In one embodiment, the features are classified at 422 as part of the training of the computer vision model during the training method 401. As depicted in FIG. 4B, in one embodiment the feature extraction of 420 and the classification of 422 may be referred to as sub-process 423 (for ease of reference with respect to FIGS. 5-8 below). In one embodiment, the sub-process 423 is performed by a processor, such as the processing unit 226 and/or the processor 240 of FIG. 2, in training a computer vision model that is then stored in memory, such as the memory 224 and/or the memory 244 of FIG. 2.

Figure 6:
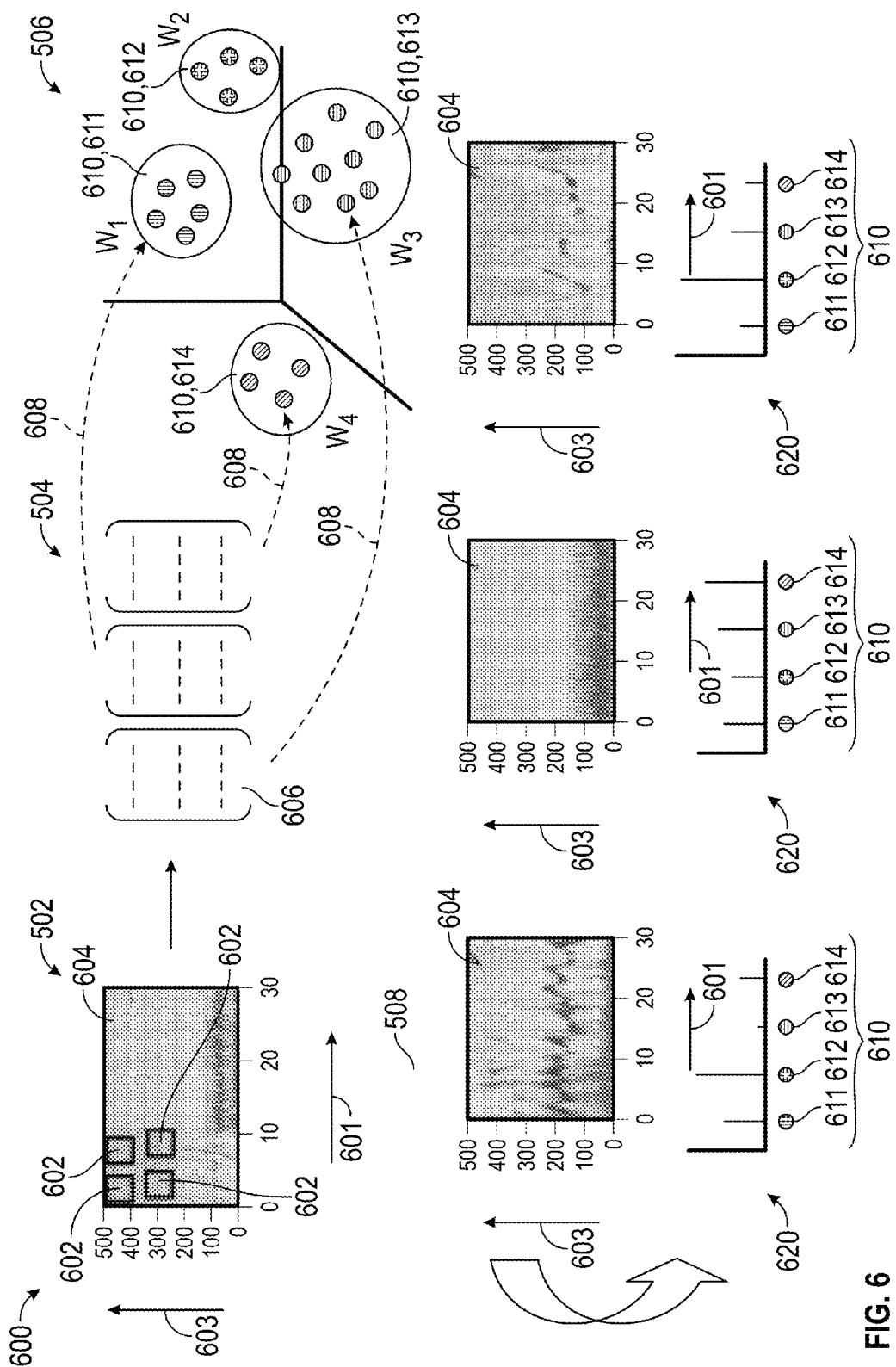
FIG. 6 provides a flow diagram for the sub-method of FIG. 5, in accordance with an exemplary embodiment.
Figure 7:
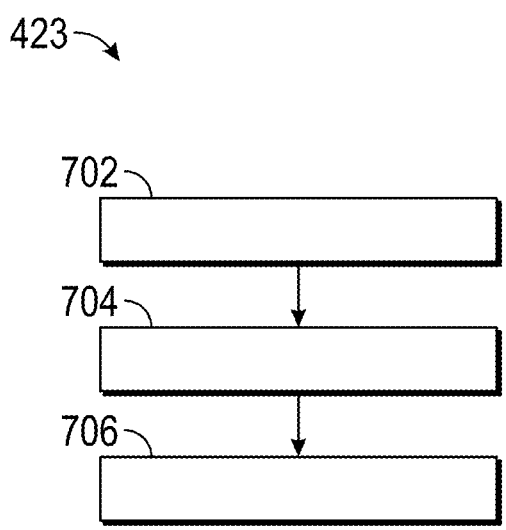
FIG. 7 is a flowchart of a sub-method of the method of FIGS. 4A-4C, namely, of utilizing a computer vision model for classification, in accordance with another exemplary embodiment in which sums of values are used as part of the computer vision model.
Figure 8:
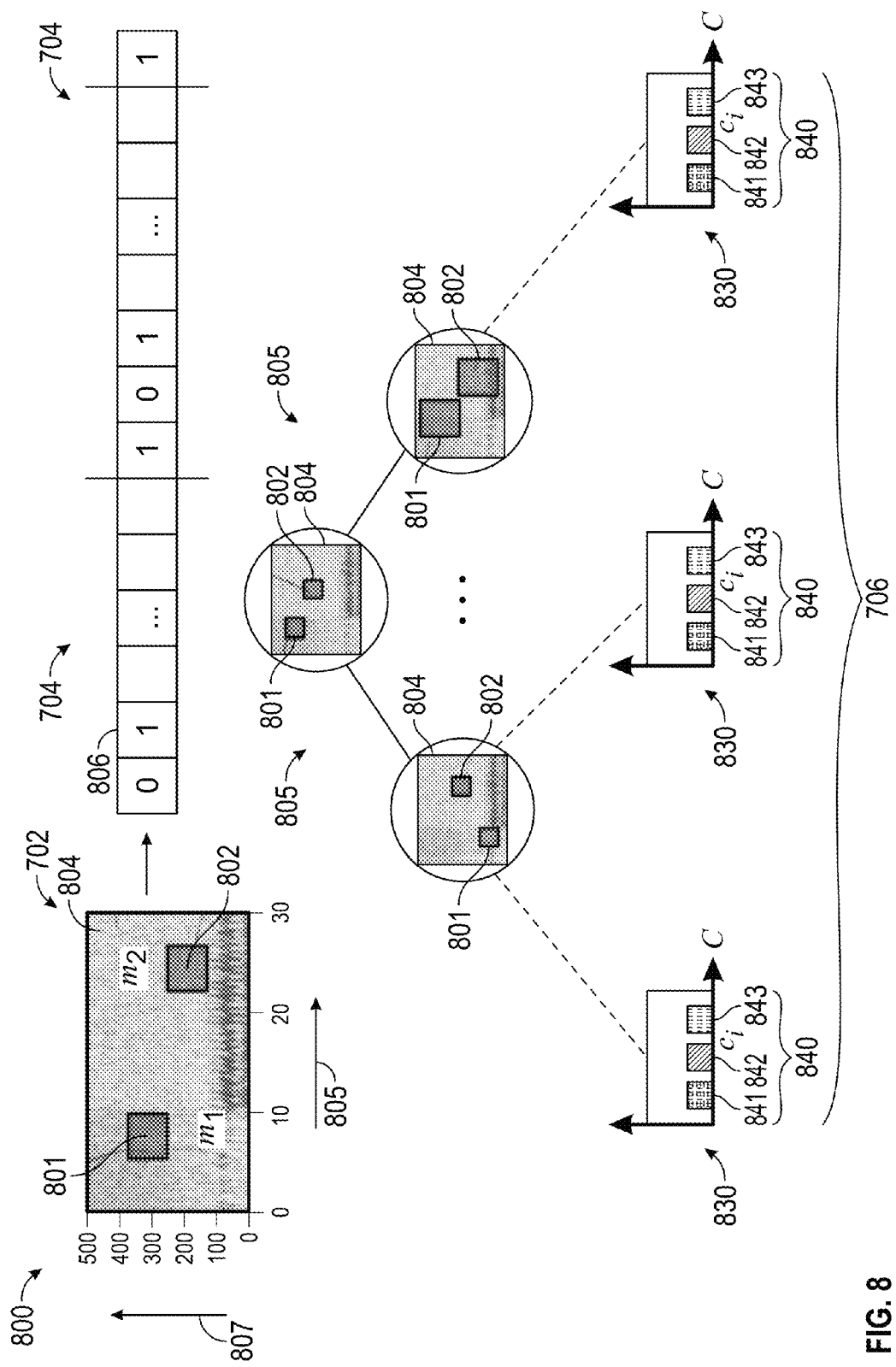
FIG. 8 provides a flow diagram for the sub-method of FIG. 7, in accordance with an exemplary embodiment.

With reference to FIGS. 5-8, exemplary embodiments of the sub-process 423 of FIG. 4B are discussed below, including (i) one embodiment in which feature vectors and vector quantization are used with a bag of words model (as depicted in FIGS. 5 and 6); and (ii) one embodiment in which binary vectors are utilized by comparing energy intensities of the spectrogram data in conjunction with a regression tree model (as depicted in FIGS. 7 and 8). Unless otherwise noted, the method of these embodiments is performed by a processor, such as the processing unit 226 and/or the processor 240 of FIG. 2.

With reference to FIGS. 5 and 6, in one embodiment (in which a bag of words model is used) each region is detected at 502. As depicted in FIG. 6, in one embodiment, the selection corresponds to various regions 602 of each spectrogram 604 (for example, in which the x-axis 601 denotes time, in seconds, and the y-axis 603 denotes frequency, in Hz). In one embodiment, each region 602 represents a picture pertaining to the object, and the various pictures of the different regions 602 collectively comprise the image of the object from the spectrogram.

Features are extracted for each region at 504. In certain embodiments, the extracted features are extracted in the form of a matrix 606, and include a scale-invariant feature transform (SIFT) descriptor and/or wavelet coefficients for each region 602 of the spectrogram 604. In one embodiment, the features are extracted and embedded into a matrix with one raw per feature vector describing the patch. In various embodiments, any one of a number of different filters may be used (e.g., steering, Gabor, as well as nonlinear filters)

A vector quantization is performed at 506 for the extracted features. As depicted in FIG. 6, in one embodiment, each of the extracted features has a corresponding relationship 608 with a corresponding cluster 610 of data points for a vector quantization in accordance with a three dimensional plot. In one embodiment, a k-means vector quantization is used. In other embodiments, any number of other clustering methods may be used. Also as depicted in FIG. 6, the plurality of clusters 610 may be identified as a first cluster 611, a second cluster 612, a third cluster 613, a fourth cluster 614, and so on, based on common features and characteristics.

The vector quantization output is used to build or train a computer vision model through classification of objects at 508. In one embodiment, the vector quantization output is used to build a bag of words representation, e.g. visual words histograms that are further used as inputs for training the classifiers. In one embodiment, the features are represented as a plurality of histograms of clusters by incorporated the vector quantization used to build a bag of words computer vision model based on syntactic representations of the features. Also in one embodiment, the classifiers may be trained separately from histograms and attached to them object class information. With reference to FIG. 6, in one embodiment, the output from the bag of words computer vision model takes the form of various clustered histograms 620, wherein the images are represented as histograms of visual words. The visual words correspond to clusters of feature vectors to which patches belong (in a soft or hard way). Image histograms and image labels are used to train the classifiers for the different types of objects (e.g. another car, a pedestrian, a bicycle, a wall, a tree, and so on) for classification. In one embodiment, once the model is built and the classifiers trained, they are stored in memory (such as the memory 224 and/or the memory 244 of FIG. 2) for subsequent retrieval from memory during the implementation method 402 of FIG. 4C (described further below) to classify objects encountered during a current vehicle or ignition cycle in which the vehicle is being driven on a road.

With reference to FIGS. 7 and 8, in another embodiment (in which the energy intensities of the spectrogram data are compared to generate binary vectors associated with a regression tree model), samples of each region are performed at 702. As depicted in FIG. 8, in one embodiment, the samples are taken with respect to multiple regions 801, 802 of reach spectrogram 804 (for example, in which the x-axis 805 denotes time, in seconds, and the y-axis 807 denotes frequency, in Hz). In one embodiment, the regions 801, 802 are selected randomly, two at a time, through various multiple iterations. Also in one embodiment, each region 801, 802 represents a picture pertaining to the object, and the various pictures of the different regions 801, 802, . . . (e.g., including non-selected regions) collectively comprise the image of the object from the spectrogram. In one embodiment, these features can be efficiently calculated using integral images.

At 704, image energy intensities are compared for the regions 801, 802 of each respective pair of regions from the spectrogram 804 to generate binary vectors. In one embodiment depicted in FIG. 8, 704 is performed through multiple comparisons 805 of various pairs of the randomly selected regions 801, 802 (two such comparisons are shown in FIG. 8 for illustrative purposes, although any number of such comparisons 805 may be performed). Also in one embodiment, the resulting comparisons are used at 704 to generate a binary vector 806, as depicted in FIG. 8. In one such example, if the energy intensity of the first randomly selected image 801 is greater than or equal to the energy intensity of the second randomly selected image 802, then a binary digit of zero (0) is provided for the binary vector 806 for this comparison. Also in one such example, if the energy intensity of the first randomly selected image 801 is less than the energy intensity of the second randomly selected image 802, then a binary digit of one (1) is provided for the binary vector 806 for this comparison. In one embodiment, 702 and 704 are repeated for various vehicles (e.g. in development and/or otherwise being sold to consumers), resulting in numerous binary vectors 806 for the various vehicles.

At 706, the binary vectors 806 are used to train the computer vision model through object classification. In one embodiment, the binary vectors 806 are associated with known object information (e.g. the types of objects) during the training of the model using sums of squares for a modified fern regression tree model, so that the binary vectors (or the associated sums of squares) can be associated with known types of known objects (e.g., another car, a pedestrian, a bicycle, a wall, a tree, and so on) from the training data, to thereby train regression model. Also as shown in FIG. 8, graphical depictions 830 may be utilized for the object classification and training of the regression model in training the model to recognize different features 840 (for example, a first feature 841, a second feature 842, a third feature 843, and so on) and/or patterns of features as being associated with specific types of objects (for example, a first feature 841, a second feature 842, a third feature 843, and so on of the data and the objects). Once the regression model is trained, the model is stored in memory (such as the memory 224 and/or the memory 244 of FIG. 2) at 424, so that the model can subsequently be retrieved from memory during the implementation method 402 of FIG. 4C (described further below) to classify objects encountered during a current vehicle or ignition cycle in which the vehicle is being driven on a road.

With reference to FIG. 4C, in various embodiments the implementation method 402 can be scheduled to run at 453 based on predetermined "online" events, and/or can run continually during operation of the vehicle 10 (e.g. a current vehicle drive or ignition cycle, after the sale of the vehicle to a customer, as the vehicle is being driven by the customer or owner on a roadway). As depicted in FIG. 4C, in one embodiment the implementation method 402 includes transmitting a first plurality of radar signals of a first waveform at 454. The radar signals are, in one example, transmitted via the transmitting channel 220 of the radar system 103 of the vehicle 10 of FIG. 1 while the vehicle 10 is driving in a road.

After the radar signals are reflected from objects on or around the road, return radar signals are received by the radar system 103 at 456 of FIG. 4C. In one example, the received radar signals are received via the receiving channel 222 of the radar system 103 of the vehicle 10 (as referenced in FIGS. 1-3) after deflection from one or more objects (e.g. other vehicles, pedestrians, trees, rocks, debris, road characteristics, and so on) on the road or otherwise in proximity to the vehicle 10. The object is detected at 407 based upon the radar received radar signals.

A first region is selected with respect to the return radar signals at 458. In one embodiment, the first region comprises a three dimensional spatial region in proximity to an object (hereafter referred to as "the object") from which the received radar signals had been reflected with respect to 405. In one such embodiment, the first region comprises a cube-shaped region proximate a portion of the object (such that multiple such cube-shaped regions would provide a more complete representation for the object). In one embodiment, the first region is selected by a processor, such as the processing unit 226 and/or the processor 240 of FIG. 2.

Information pertaining to the first region is analyzed at 460. In one embodiment, the information includes a correspondence or plot of the frequency of the received radar signals over time. The resulting analyzed data (including the correspondence of the frequency over time) is represented in a spectrogram generated at 462 for the first region. The analysis of the information and generation of the spectrogram are performed by a processor, such as the processing unit 226 and/or the processor 240 of FIG. 2.

A determination is made at 464 as to whether analysis is required for any additional regions. In one embodiment, the determination of 464 is whether there any remaining spatial regions proximate the object for which a spectrogram has not yet been generated. In one embodiment, this determination is made by a processor, such as the processing unit 226 and/or the processor 240 of FIG. 2.

If it is determined that analysis is required for one or more additional regions requiring analysis, a new region is selected at 466. In one embodiment, at 466 a new three dimensional spatial region is selected, similar to the first region of 458, but at a slightly different location in proximity to the object. In one embodiment, the new region is selected by a processor, such as the processing unit 226 and/or the processor 240 of FIG. 2. The method proceeds to 460, and 460-466 repeat in this manner until there are no additional regions required for analysis (as determined at 464), at which point the method proceeds to 468, described below.

At 470, features are extracted from the spectrograms for the vehicle that have been collected during the current vehicle drive or ignition cycle for the vehicle. In one embodiment, the features are extracted in conjunction with a computer vision model that had previously been training during the training method 401 discussed above. In one embodiment, the features are classified at 472 as part of the computer vision model that was previously trained during the training method 401. As depicted in FIG. 4C, in one embodiment the feature extraction of 470 and the classification of 472 may be referred to as sub-process 473. In one embodiment, the sub-process 473 is performed by a processor, such as the processing unit 226 and/or the processor 240 of FIG. 2, using a previously-trained computer vision model that is retrieved from memory, such as the memory 224 and/or the memory 244 of FIG. 2.

In one embodiment of 470 (and 473), the feature extraction and classification is performed in conjunction with the bag of words model described above with respect to FIGS. 5 and 6. Specifically, in this embodiment, during the implementation method 402 using the bag of words model, the region selection of 502 and the feature extraction of 504 are performed as described above in connection with FIGS. 5 and 6 for the training method 401. However, during the implementation method 402, the classification of 472 is performed by comparing the feature vectors for the current vehicle drive or ignition cycle with known feature vectors from the stored model from the training method 401 that are known to correspond with specific types of objects (e.g., another car, a pedestrian, a bicycle, a wall, a tree, and so on).

In another embodiment of 470 (and 473), the feature extraction and classification is performed in conjunction with the regression model described above with respect to FIGS. 7 and 8. Specifically, in this embodiment, during the implementation method 402 using the regression model, the region sampling of 702 and the intensity comparisons/creation of the binary vector of 704 are performed in connection with the modified regression tree model as described above in connection with FIGS. 7 and 8 for the training method 401. However, during the implementation method 402, the classification of 472 is performed by comparing the binary vectors for the current vehicle drive or ignition cycle with known binary vectors from the stored model from the training method 401 that are known to correspond with specific types of objects (e.g., another car, a pedestrian, a bicycle, a wall, a tree, and so on). In one embodiment, the probabilities that particular binary vectors belong to different object classes are learned during the training stage. Also in one embodiment, subsequently, during the testing stage, new binary vectors are classified based on the maximal likelihood criteria (e.g., maximal class probability).

The objects may be tracked over time at 474, for example by tracking changes in movement and/or position of the objects using the received radar signals and the classification. Vehicle actions may be initiated as appropriate at 476 based upon the classification and/or tracking. In one example, if an object is classified as an object of concern (e.g., a pedestrian, bicycle, other vehicle, and/or other large object) and the distance between the vehicle 10 and the tracked object is less than a predetermined threshold (or an estimated time of contact between the vehicle 10 and the tracked object) under their current respective trajectories is less than a predetermined threshold), then an alert (e.g., a visual or audio alert to the driver) may be provided and/or an automatic vehicle control action (e.g., automatic braking and/or automatic steering) may be initiated, for example by a processor outputting one or more control signals for the steering system 150 and/or the braking system 160 of FIG. 1. In various embodiments, the method 400 may terminate at 478 when the action is complete, or when further use of the radar system and/or the method 400 is no longer required (e.g. when the ignition is turned off and/or the current vehicle drive and/or ignition cycle terminates).

Methods and systems are provided herein for classifying objects for radar systems of vehicles. The disclosed methods and systems provide for the classification of objects using radar signal spectrogram data in combination with one or more computer vision models.

It will be appreciated that the disclosed methods, systems, and vehicles may vary from those depicted in the Figures and described herein. For example, the vehicle 10, the radar control system 12, the radar system 103, the controller 104, and/or various components thereof may vary from that depicted in FIGS. 1-3 and described in connection therewith. In addition, it will be appreciated that certain steps of the method 400 may vary from those depicted in FIGS. 4-8 and/or described above in connection therewith. It will similarly be appreciated that certain steps of the method described above may occur simultaneously or in a different order than that depicted in FIGS. 4-8 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method for object classification for a radar system of a vehicle, the method comprising the steps of:
   obtaining, via a processor, spectrogram data from a plurality of spectrograms pertaining to an object proximate the vehicle based on received radar signals for the radar system;
   aggregating, via the processor, the spectrogram data from each of the plurality of spectrograms into a clustering computer vision model;
   classifying, via the processor, the object based on the aggregation of the spectrogram data from each of the plurality of spectrograms into the clustering computer vision model
   extracting, via the processor, features from each of the plurality of spectrograms;
   performing, via the processor, a vector quantization of the features; and
   incorporating, via the processor, the vector quantization into the clustering computer vision model.

2. The method of claim 1, further comprising:
   identifying a plurality of three dimensional spatial regions proximate the object, wherein the obtaining spectrogram data comprises obtaining spectrogram data from the plurality of spectrograms, each of the plurality of spectrograms pertaining to a corresponding one of the plurality of three dimensional spatial regions.

3. The method of claim 1, wherein the incorporating the vector quantization comprises:
   representing the features as a plurality of histograms of clusters using the vector quantization and a bag of words computer vision model.

4. The method of claim 1, wherein the aggregating the spectrogram data comprises comparing energy intensities of the spectrogram data from the plurality of spectrograms via calculated sums of values from each of the plurality of spectrograms using the computer vision model.

5. The method of claim 4, wherein the aggregating is performed using a modified regression tree computer vision model.

6. A radar control system for a vehicle, the radar control system comprising:
   a transmitter configured to transmit radar signals;
   a receiver configured to receive return radar signals after the transmitted radar signals are deflected from an object proximate the vehicle; and
   a processor coupled the receiver and configured to:
   obtain spectrogram data from a plurality of spectrograms pertaining to the object based on the received radar signals;
   aggregate the spectrogram data from each of the plurality of spectrograms into a clustering computer vision model;
   classify the object based on the aggregation of the spectrogram data from each of the plurality of spectrograms into the clustering computer vision model;
   extract features from each of the plurality of spectrograms;
   perform a vector quantization of the features; and
   incorporate the vector quantization into the clustering computer vision model.

7. The radar control system of claim 6, wherein the processor is further configured to:
   identify a plurality of three dimensional spatial regions proximate the object, wherein each of the plurality of spectrograms pertains to a corresponding one of the plurality of three dimensional spatial regions.

8. The radar control system of claim 6, wherein the processor is further configured to represent the features as a plurality of histograms of clusters using the vector quantization and a bag of words computer vision model.

9. The radar control system of claim 6, wherein the processor is further configured to compare energy intensities of the spectrogram data from the plurality of spectrograms via calculated sums of values from each of the plurality of spectrograms using the clustering computer vision model.

10. The radar control system of claim 9, wherein the clustering computer vision model comprises a modified regression tree computer vision model.

11. A computer system for object classification for a radar system of a vehicle, the computer system comprising:
    a non-transitory, computer readable storage medium storing a program, the program configured to at least facilitate:
    obtaining spectrogram data from a plurality of spectrograms pertaining to the object based on received radar signals for the radar system;
    aggregating the spectrogram data from each of the plurality of spectrograms into a clustering computer vision model;
    classifying the object based on the aggregation of the spectrogram data from each of the plurality of spectrograms into the clustering computer vision model;
    extracting features from each of the plurality of spectrograms;
    performing a vector quantization of the features; and
    incorporating the vector quantization into the clustering computer vision model.

12. The computer system of claim 11, wherein the program is further configured to at least facilitate:
    identifying a plurality of three dimensional spatial regions proximate the object, wherein each of the plurality of spectrograms pertains to a corresponding one of the plurality of three dimensional spatial regions.

13. The computer system of claim 11, wherein the program is further configured to at least facilitate representing the features as a plurality of histograms of clusters using the vector quantization and a bag of words computer vision model.

14. The computer system of claim 11, wherein the program is further configured to at least facilitate comparing energy intensities of the spectrogram data from the plurality of spectrograms via calculated sums of values from each of the plurality of spectrograms using a modified regression tree computer vision model.

* * * * *